US 9,036,460 B2

(12) United States Patent
Maaref

(10) Patent No.: US 9,036,460 B2
(45) Date of Patent: May 19, 2015

(54) SYSTEM AND METHOD FOR COOPERATIVE PRECODING IN HETEROGENOUS TWO-TIER WIRELESS NETWORKS

(71) Applicant: FutureWei Technologies, Inc., Plano, TX (US)

(72) Inventor: Amine Maaref, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 96 days.

(21) Appl. No.: 13/963,983

(22) Filed: Aug. 9, 2013

(65) Prior Publication Data

US 2015/0043436 A1 Feb. 12, 2015

(51) Int. Cl.
*H04J 11/00* (2006.01)
*H04L 12/28* (2006.01)
(Continued)

(52) U.S. Cl.
CPC .................................. *H04L 25/028* (2013.01)

(58) Field of Classification Search
CPC ........ H04B 1/38; H04B 7/024; H04B 7/0413; H04B 7/0417; H04B 7/0452; H04B 7/0456; H04B 7/0626; H04B 7/0634; H04B 7/0632; H04B 7/0639; H04B 15/00; H04L 1/00; H04L 5/0048; H04L 5/0057; H04L 25/028; H04L 25/03821; H04L 25/03898; H04L 25/03949; H04W 24/02; H04W 36/20; H04W 52/24; H04W 52/244; H04W 52/245; H04W 72/082
USPC ......... 370/203–208, 229–240, 252, 286–292, 370/310–350; 375/254, 278, 284–285, 296, 375/346–348; 455/63.1, 67.13, 114.2, 135, 455/222, 277.2, 278.1, 296, 501
See application file for complete search history.

(56) References Cited

U.S. PATENT DOCUMENTS 8,391,130 B2 * 3/2013 Pi .................................. 370/208
8,774,014 B2 * 7/2014 Seo et al. ...................... 370/246
(Continued)

OTHER PUBLICATIONS

Sung, H., "Generalized channel inversion methods for multiuser MIMO systems," *IEEE Transactions on Communications*, vol. 57, No. 11, Nov. 2009, pp. 3489-3499.
(Continued)

*Primary Examiner* — Tri H Phan
(74) *Attorney, Agent, or Firm* — Slater & Matsil, L.L.P.

(57) ABSTRACT

Embodiments are provided for a cooperative cross-tier precoding (CTP) and intra-tier precoding (ITP) scheme for two-tier networks. The cooperative precoding scheme allows exploitation of extra transmit dimensions at the second-tier network, thereby increasing the achievable throughput at the second-tier network. The embodiments allow significant increase in throughput of the second-tier network due to both CTP between the second-tier network and the first-tier network, and efficient ITP between the second-tier network transmitters. The increase in transmit dimension allows for efficient linear inra-tier precoding, which significantly reduces the intra-tier interference. A processor coupled to the second-tier network transmitters is configured to perform CTP of transmit signals in the second-tier network for cancelling signal interference from the second-tier network transmitters to a first-tier network receiver, thereby generating CTP matrix information. The processor then performs, using the CTP matrix information, ITP for reducing intra-signal interference from the second-tier transmitters to corresponding second-tier receivers.

27 Claims, 2 Drawing Sheets

(51) Int. Cl.
*H04W 4/00* (2009.01)
*H04B 7/208* (2006.01)
*H04B 1/10* (2006.01)
*H04L 25/02* (2006.01)

(56) References Cited

U.S. PATENT DOCUMENTS

| | | | |
|---|---|---|---|
| 2013/0044678 A1* | 2/2013 | Qu et al. | 370/328 |
| 2013/0088986 A1* | 4/2013 | Xiao et al. | 370/252 |
| 2013/0094547 A1* | 4/2013 | Kang et al. | 375/219 |
| 2013/0114496 A1* | 5/2013 | Mazzarese et al. | 370/312 |
| 2013/0155897 A1* | 6/2013 | Ihm et al. | 370/252 |

OTHER PUBLICATIONS

Cardoso, L., "Orthogonal LTE Two-Tier Cellular Networks," *IEEE International Conference on Communications (ICC)*, Jun. 5-9, 2011, pp. 1-5.

Spencer, Q., "Zero-forcing methods for downlink spatial multiplexing in multiuser MIMO channels," *IEEE Transactions on Signal Processing*, vol. 52, No. 2, Feb. 2004, pp. 461-471. doi: 10.1109/TSP.2003.821107.

Cardoso, L., "Vandermonde frequency division multiplexing for cognitive radio," *IEEE 9th Workshop on Signal Processing Advances in Wireless Communications*, Jul. 2008, pp. 421-425.

* cited by examiner

SYSTEM AND METHOD FOR COOPERATIVE PRECODING IN HETEROGENOUS TWO-TIER WIRELESS NETWORKS

TECHNICAL FIELD

The present invention relates to the field of wireless communications, and, in particular embodiments, to a system and method for cooperative precoding in two-tier cellular networks.

BACKGROUND

Two-tier networks comprise a conventional cellular network overlaid with shorter range second-tier networks or hotspots, also referred to as small-cells, such as using femtocells, distributed antennas, or relays. Such coexisting systems can increase spectral efficiency for serving users. Some second-tier systems have priorities and can allow some level of interference to the primary systems, e.g. conventional cellular networks or macro-cells. Other second-tier systems can opportunistically transmit without interfering with existing primary systems. Such opportunistic two-tier systems include the so-called Vandermonde frequency Division Multiple Access (VFDM) systems which allow the coexistence of a macro-cell comprising multiple primary users and a small-cell comprising multiple secondary user pairs. In VFDM, precoding at small-cell transmitters causes no interference to the macro-cell. However, a drawback of such systems is that precoding at the small-cell transmitters is carried out independently, thereby causing a waste of extra transmit dimensions as well as low efficiency linear precoding due to dimension restriction. An improved precoding scheme for two-tier cellular networks is needed.

SUMMARY OF THE INVENTION

In accordance with an embodiment of the disclosure, a method for reducing interference or avoiding signal interference in a first tier network from a second tier network and within the second tier network is provided. In this example, the method includes performing cooperative cross-tier precoding (CTP) for transmit signals of transmitter devices in the second tier network, generating CTP matrix information in accordance with the performed cooperative CTP, and performing intra-tier precoding (ITP) for the transmit signals in accordance with the CTP matrix information. The method further includes forwarding information about the cooperative CTP and ITP to the transmitter devices in the second tier network. An apparatus for performing this method is also provided.

In accordance with another embodiment of the disclosure, a network component adapted to reduce or avoid signal interference in a first tier network from a second tier network and in a second tier network is provided. In this example, the network component comprises a transmitter, and a processor communicatively connected to the transmitter. The processor is configured to perform both cooperative cross-tier precoding (CTP) and intra-tier precoding (ITP) for transmit signals of transmitter devices in the second tier network. The processor performs the ITP with consideration of information generated from the cooperative CTP. The transmitter is configured to send information about the cooperative CTP and ITP to the transmitter devices in the second tier network.

In accordance with yet another embodiment of the disclosure, another network component adapted to reduce or avoid signal interference in a first tier network from a second tier network and in a second tier network is provided. In this example, the network component includes a transmitter and a processor communicatively connected to the transmitter. The processor is configured to perform both a first precoding and a second precoding for transmitter devices in the second tier network. The processor performs the first pre-coding to reduce or cancel interference in the first tier network caused by transmissions of the transmitter devices in the second tier network. The processor performs the second pre-coding in accordance with information generated from the first precoding to reduce or cancel intra-signal interference in the second tier network caused by the transmissions from transmitter devices in the second tier network. The transmitter is configured to forward information about the first precoding and the second precoding to the transmitter devices in the second tier network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for a cooperative cross-tier and intra-tier precoding scheme for two-tier networks, e.g., using multi-user Vandermonde Frequency Division Multiple Access (MU-VFDM). The cooperative precoding scheme allows exploitation of extra transmit dimensions at the second-tier network, thereby increasing the achievable throughput at the second-tier network (or the small-cell). The embodiments allow significant increase in throughput of the second-tier network or small-cells due to both cross precoding between the small-cell and the macro-cell, referred to herein as cross-tier precoding (CTP), and efficient intra-precoding between the small-cell transmitters, referred to herein as intra-tier precoding (ITP). Cooperative CTP for the small-cell transmitters allows for increase in the transmit dimensions, thus significantly improving the throughput of the second-tier network or small-cell. The transmit dimension increase allows for efficient linear inra-tier precoding, which significantly reduces the intra-tier interference.

Figure 1:
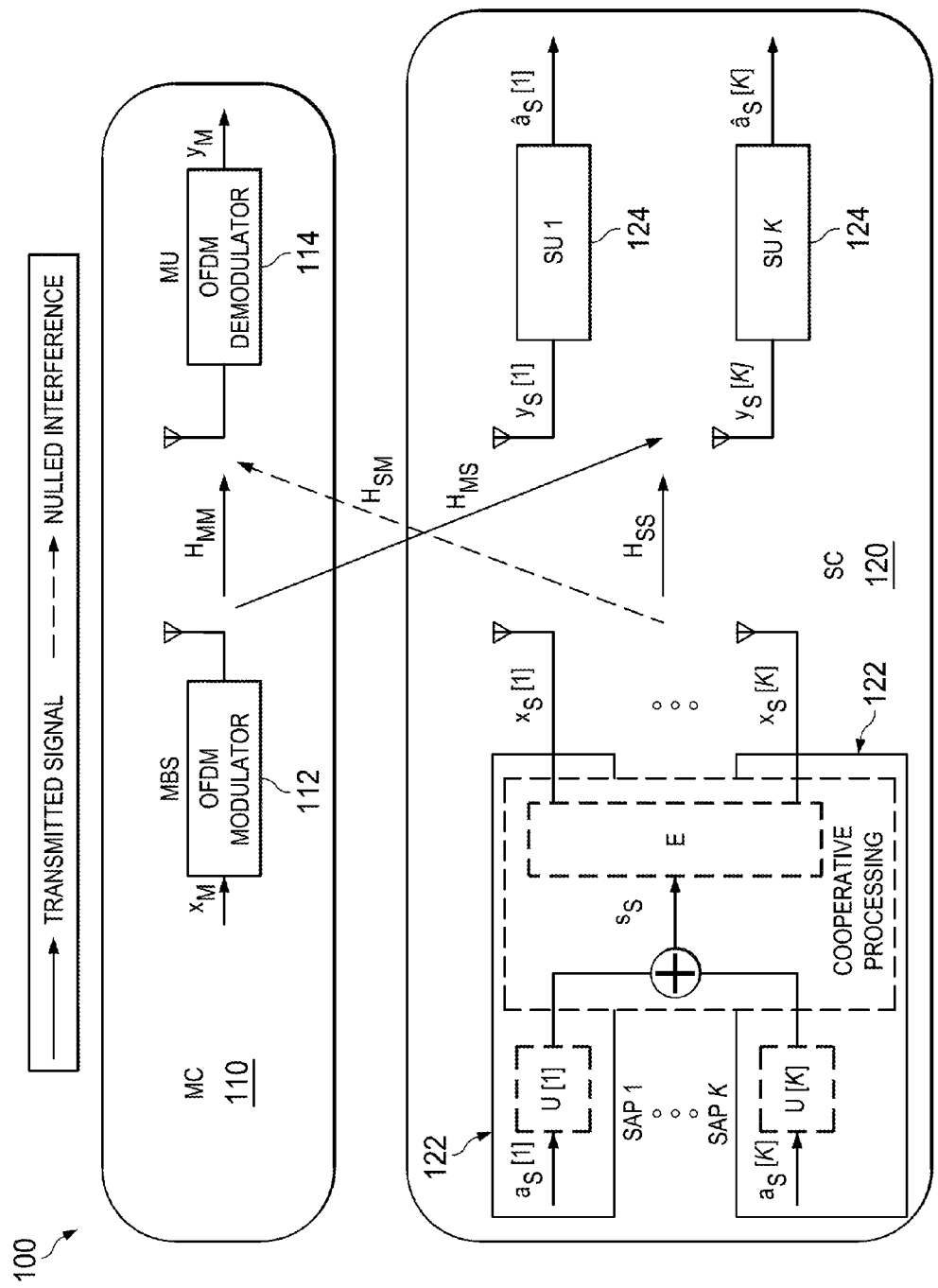
FIG. 1 illustrates an example of a two-tier network or system.

FIG. 1 shows a two-tier network or system 100 comprising a macro-cell (MC) 110 (e.g., as in conventional cellular networks) and a second-tier network or small-cell (SC) 120. The MC 110 comprises a MC bases station (MBS) 112 and M MC user devices (MUs) 114, where M is an integer. Examples of user devices include smartphones, computers (e.g., desktops, laptops, tablets), or any other communication devices. The MBS 112 and M MUs 114 may communicate using orthogonal frequency-division multiplexing (OFDM) or OFDM Access (OFDMA) transmissions. The SC 120 comprises K SC access points (SAPs) 122 (e.g., femto-cells, distributed antennas, relays) and K SC user devices (SUs) 124, where K is an integer. The SUs 124 may be similar to the MUs 114. The K APs 122 and K MUs 114 may communicate using MU-VFDM transmissions. The K SAPs 122 may communicate with K respective SUs 124 in pairs (e.g., each SAP 122 communicates with one corresponding SU 124). In another embodiment, multiple pairs of UEs may communicate with each other (e.g., in UE to UE communications) via device-to-device (D2D) communications. In this case, the channels or signals precoded for signal avoidance (as discussed below) correspond to the transmissions in the pairs of UEs without SAPs.

Considering, for instance, an OFDM transmission (e.g., on downlink for MC 110 and SC 120) with N subcarriers and a cyclic (CP) length of L used in MC 110, the received vector $y_M$ at a considered $M^{th}$ MU 114 is represented as:

$$y_M = H_{MM} x_M + H_{SM} x_S + n_M, \quad (1)$$

where $H_{MM}$ is the channel frequency response matrix in OFDM transmission, $x_M$ is the transmitted vector from MBS 112, $H_{SM}$ is the overall cross-channel matrix from SAPs 122 to the considered MU 114, and $x_S$ is the overall transmitted signal vector from the SAPs 122. The overall transmitted signal vector from the SAPs 122 can be expressed as:

$$x_S = \begin{pmatrix} x_S[1] \\ \vdots \\ x_S[K] \end{pmatrix}. \quad (2)$$

The overall cross-channel matrix from the SAPs 122 can be expressed as:

$$H_{SM} = (H_{SM}[1], H_{SM}[2], \ldots, H_{SM}[K]), \quad (3)$$

Additionally, a precoder (not shown) is used in the two-tier network or system 100 to pre-process the transmit signal at the SAPs 122 so that the transmitted signal vector from the SAPs 122, $x_S$, generates no interference to the received signal vector at the considered MU, $y_M$. The cross-tier precoder may be located at or away from the SC 120, and is coupled to the SAPs 122, for example any suitable wired or wireless connections. The precoder may have knowledge of channel state information (CSI) for channels or transmissions from the SAPs 122 to each considered MU 114, CSI for transmissions from the SAPs 122 to the SUs 124, and CSI for transmissions from the MBS 112 to the SUs 124. This knowledge is used in the cooperative CTP, such as to generate the matrices and vectors for the different calculations below.

At the precoder, a transmitted signal vector from the SAPs 112 can be expressed as:

$$x_S = E s_S, \quad (4)$$

where E represents the CTP matrix, $x_S$ represents the transmitted symbol vector from the SAPs 122, and $s_S$ is the transmitted symbol vector. If CTP is performed independently at each individual SAP 122, the overall transmit dimension (or the number of overall symbols transmitted by K SAPs 122), J, is equal to KL (the product of the number of SAPs 122 and the CP length). However, using cooperation among the SAPs 122, the overall transmit dimension, J, can be greatly increased and the capacity of VFDM transmission is improved accordingly. In addition, increase of the overall transmit dimension allows to use more efficient ITP to cancel inter-SAP interference, as described below.

The precoder is further configured for cooperative CTP, where the generated CTP matrix, E, is not necessarily diagonal. The generated matrix, E, by the precoder can be any matrix for cancelling interference caused by SAPs 122 in the SC 110, which satisfies the following:

$$H_{SM} E = 0. \quad (5)$$

Specifically, a single value decomposition (SVD) is applied on the channel matrix, $H_{SM}$, to obtain:

$$H_{SM} = U \Lambda \Lambda^H, \quad (6)$$

where U and V are both unitary, and $\Lambda$ is diagonal. The SVD can be further represented as:

$$H_{SM} = U \Lambda (V_1, V_2)^H = U \Sigma V_1^H, \quad (7)$$

where $V_1$ and $V_2$ are sub-matrices of V. From (7), $H_{SM} V_2 = 0$. Hence, the cooperative CTP matrix can be designed as:

$$E = V_2. \quad (8)$$

This SVD assumes the diagonal matrix, $\Sigma$, is full rank. In this case, the overall transmit dimension is $J=(K-1)N+KL$. This means that, using the cooperative CTP, $(K-1)N+KL$ symbols can be transmitted from the K SAPs 122, e.g., in comparison to only KL symbols if the CTP is performed independently at each of the K individual SAPs 122. The extra $(K-1)N$ dimensions result from the exploitation of cooperative CTP for the SAPs 122.

Based on the operations at the existing link, the interference signal at the existing receiver after post-processing can also be expressed as $$\hat{I} = D^M T_r H_{SM} x_s = D^M T_r H_{SM} E s_S, \quad (22)$$

where a mapping matrix $T_r$ is used to obtain the post-processed signal vector at the primary receiver as $$\hat{y}_M = D^M T_r y^M + D^M T_r (H_{MM} x_M + H_{SM} x_s + \tilde{n}^M), \text{ where} \quad (8)$$

$D^M = \text{diag}\{D^M[0], \ldots, D^M[N-1]\}$ is a postcoding matrix at the primary receiver, $\tilde{n}^M = D^E T_r n_M$, E and $s_S$ are the precoding matrix and the source signal vector at the new transmitter, respectively. To generate interference free transmission to the existing link, the transmitted signal of the new link uses the null space of the existing link. The precoding matrix E satisfies the following condition $$\tilde{H}_{SM} E = 0, \quad (23)$$

where $\tilde{H}_{SM}$ contains the rows of $D^E T_r H_{SM}$ that satisfy the corresponding $P_k^E[i] \neq 0$ where is the power allocation at the $i^{th}$ subcarrier and $k^{th}$ eigenmode. Thus, the CTP E can be chosen as $$E = \text{null}(\tilde{H}_{SM}).$$

As such, if the power allocation of the primary system (first-tier network) is known, more symbols can be transmitted from the secondary system (second tier-network).

Additionally, the same precoder or a second precoder implements ITP to cancel inter-SAP interference from the SAPs 122 to the SUs 124. The ITP process may also use the knowledge of CSI for channels or transmissions from the SAPs 122 to each considered MU 114, CSI for transmissions from the SAPs 122 to the SUs 124, and CSI for transmissions from the MBS 112 to the SUs 124. The ITP is implemented in conjunction with the CTP process above. For ITP, the overall received vector at the SUs is expressed as:

$$y_S = H_{SS} x_S + n_S, \qquad (9)$$

where $y_S$ and $n_S$ are the overall received signal vector at the SUs 124 and additive noise plus interference from the MBS 112 at the SUs 124, respectively, and $H_{SS}$ is the overall equivalent channel matrix.

Specifically, ITP processing takes into account the cooperative CTP processing using $x_S = E_{SS}$ from (4). Accordingly, the overall receive signal vector at the SAPs 124 can be expressed as:

$$y_S = \tilde{H}_{SS} s_S + n_S, \qquad (15)$$

where $\tilde{H}_{SS} = H_{SS} E$, E being the generated CTP matrix above. The size of $\tilde{H}_{SS}$ depends on the CTP used. For non-cooperative CTP, the size of $\tilde{H}_{SS}$ is KN×KL. In this case, the overall transmit dimension is always less than the overall receive dimension since L<N. As a result, a matched filter (MF) is used as ITP. However using cooperative CTP in the system 100, as described above, $\tilde{H}_{SS}$ becomes a matrix with size KN≤[(K−1)N+KL] matrix. Thus, the overall transmit dimension is larger than the overall receive dimension, allowing the use of zero forcing (ZF), which is a more efficient precoding than MF. In other embodiments, the ITP may be implemented using a minimum mean square error (MMSE) precoder or any other non-linear precoding type.

In one implementation, the inter-SAP interference is canceled using block diagonal (BD)-ZF. In this case, the interference from other SAPs 122 is canceled at a considered $k^{th}$ SU 124 while the self-interference, e.g., inter-symbol interference, can be handled by the kth SU 124. In the case of using BD-ZF, a water-filling algorithm may also be implemented to optimize or improve power allocation of transmit signals at each of the APs. The BD-ZF based ITP may use statistical properties of interference and noise. A capacity-achieving ITP can be designed using the correlation matrix of interference to whiten the channel. SVD of the equivalent channel can then be implemented to design the ITP. In another implementation, the inter-SAP interference is canceled using a complete-diagonal ZF, which can cancel both inter-SAP interference and self-interference at the SU 124. In this case, no additional processing is required at each individual SU 124. Although complete diagonal-ZF can simplify the receiver structure, it may reduce the throughput or requires higher power at the transmitter. Unlike complete-diagonal ZF, BD-ZF may not be possible when KN>[(K−1)N+KL].

Figure 2:
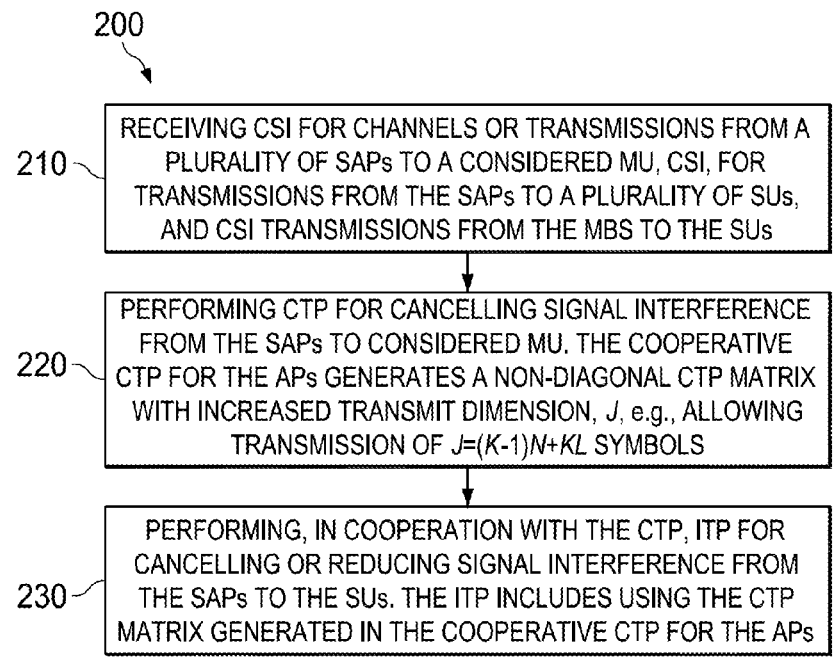
FIG. 2 illustrates an embodiment of a cooperative cross-tier and intra-tier precoding method for a tow-tier network or system.

FIG. 2 shows an embodiment of a cooperative cross-tier and intra-tier precoding method 200 for a tow-tier network or system, such as the tow-tier network or system 100. The method 200 can be implemented by one or more precoders located at the network/system or at a remote location and coupled to the SAPs in the system (e.g., the SAPs 122) of the small-cell and possibly to a MBS (e.g., MBS 112) of the macro-cell. Alternatively, the precoders are coupled to transmitting UEs in communications with corresponding receiver UEs via D2D communications. At step 210, the precoder(s) receive(s) CSI for transmissions from a plurality of SAPs (or transmitting UEs) to a considered MU, CSI for channels or transmissions from the SAPs to a plurality of SUs (or receiver UEs), and CSI for transmissions from the MBS to the SUs (or receiver UEs). At step 220, the precoder(s) perform(s) CTP for cancelling signal interference from the SAPs (or transmitter UEs) to the considered MU. The cooperative CTP for the SAPs (or transmitter UEs) generates a non-diagonal CTP matrix with increased transmit dimension, J, e.g., allowing for transmission of up to J=(K−1)N+KL symbols. At step 230, the precoder(s) perfom(s), in cooperation with the CTP, ITP for cancelling or reducing signal interference from the SAPs (or transmitter UEs) to the SUs (or receiver UEs). The ITP includes using the CTP matrix generated in the cooperative CTP for the SAPs (or transmitter UEs).

Figure 3:
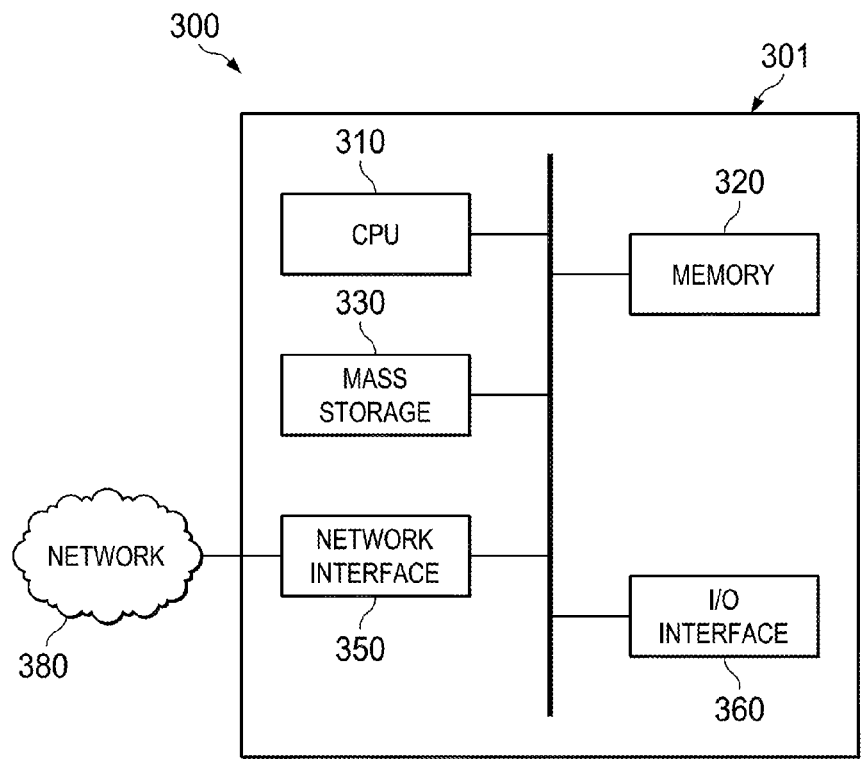
FIG. 3 illustrates a diagram of an embodiment processing system that can be used to implement various embodiments.

FIG. 3 is a block diagram of an exemplary processing system 300 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for reducing or avoiding signal interference in a first tier network from a second tier network and within the second tier network, the method comprising:
   performing, by a network device, cooperative cross-tier precoding (CTP) for transmit signals of transmitter devices in the second tier network;
   generating, by the network device, CTP matrix information in accordance with the performed cooperative CTP;
   performing, by the network device, intra-tier precoding (ITP) for the transmit signals in accordance with the CTP matrix information; and
   forwarding information about the cooperative CTP and ITP to the transmitter devices in the second tier network.

2. The method of claim 1 further comprising:
   receiving, by the network device from a user device in the first tier network, channel state information (CSI) of signals received by the user device in the first tier network from the transmitter devices in the second tier network,
   wherein the performing the cooperative CTP includes performing the cooperative CTP in accordance with the CSI, and
   wherein the performing the ITP includes performing the ITP in accordance with the CSI.

3. The method of claim 1 further comprising:
   receiving, by the network device from user devices in the second tier network, channel state information (CSI) of signals received by the user devices in the second tier network from the transmitter devices in the second tier network,
   wherein the performing the cooperative CTP includes performing the cooperative CTP in accordance with the CSI, and
   wherein the performing the ITP includes performing the ITP in accordance with the CSI.

4. The method of claim 1 further comprising:
   receiving, by the network device from user devices in the second tier network, channel state information (CSI) of signals received by the user devices in the second tier network from a base station in the first tier network,
   wherein the performing the cooperative CTP includes performing the cooperative CTP in accordance with the CSI, and
   wherein the performing the ITP includes performing the ITP in accordance with the CSI.

5. The method of claim 1 further comprising:
   obtaining power allocation of transmit signals in the first tier network; and
   increasing a number of transmit symbols for the transmit signals in the second tier network in accordance with the power allocation of transmit signals in the first tier network.

6. The method of claim 1, wherein generating the CTP matrix information comprises generating a non-diagonal CTP matrix.

7. The method of claim 6, wherein generating the non-diagonal CTP matrix comprises generating the non-diagonal CTP matrix having a number of dimensions that is equal to $(K-1)N+KL$, where K is a total number of user devices in the second tier network, N is a total number of subcarriers used in the first tier network, and L is a cyclic prefix (CP) length used in the first tier network.

8. The method of claim 7, wherein performing the cooperative CTP includes allocating, for the transmitted signals, a number of symbols that is equal to or less than the number of dimensions of the non-diagonal CTP matrix.

9. The method of claim 1, wherein the transmitter devices include user devices.

10. The method of claim 1, wherein the transmitter devices include access points, distributed antennas, or relays.

11. The method of claim 1, wherein the second tier network supports multi-user Vandermonde Frequency Division Multiple Access (MU-VFDM) communications, and wherein the first tier network supports orthogonal frequency-division multiplexing (OFDM) or OFDM Access (OFDMA) communications.

12. A network component adapted to reduce or avoid signal interference in a first tier network from a second tier network and within the second tier network, the network component comprising:
    a transmitter; and
    a processor communicatively connected to the transmitter, wherein the processor is configured to perform both cooperative cross-tier precoding (CTP) and intra-tier precoding (ITP) for transmit signals of transmitter devices in the second tier network, the processor being configured to perform the ITP with consideration of information generated from the cooperative CTP, and
    wherein the transmitter is configured to send information about the cooperative CTP and ITP to the transmitter devices in the second tier network.

13. The network component of claim 12, wherein the cooperative CTP and ITP are performed in accordance with at least one of channel state information (CSI) of signals received by a user device in the first tier network from the transmitter devices in the second tier network, CSI of signals received by user devices in the second tier network from the transmitter devices in the second tier network, and CSI of signals received by the user devices in the second tier network from a base station in the first tier network.

14. The network component of claim 12, wherein the processor being configured to perform cooperative CTP includes the processor being configured to allocate a total number of symbols for the transmit signals that is equal to or less than $(K-1)N+KL$, where K is a total number of user devices in the second tier network, N is a total number of subcarriers used in the first tier network, and L is a cyclic prefix (CP) length used in the first tier network.

15. The network component of claim 12, wherein the processor being configured to perform both cooperative CTP and ITP includes the processor being configured to cancel inter-symbol interference in the transmit signals using block diagonal zero forcing (BD-ZF) technique.

16. The network component of claim 12, wherein the processor being configured to perform both cooperative CTP and ITP includes the processor being configured to implement a water-fill algorithm for the transmit signals.

17. The network component of claim 12, wherein the processor being configured to perform both cooperative CTP and ITP includes the processor being configured to cancel inter-symbol interference in the transmit signals using complete diagonal zero forcing (ZF) technique.

18. The network component of claim 12, wherein the processor being configured to perform both cooperative CTP and ITP includes the processor being configured to cancel inter-symbol interference in the transmit signals using a minimum mean square error (MMSE) or a non-linear precoding method.

19. The network component of claim 12, wherein the processor being configured to perform both cooperative CTP and ITP includes the processor being configured to compute a correlation matrix of interference plus noise in accordance with statistical properties of interference and noise.

20. The network component of claim 12, wherein the processor being configured to perform both cooperative CTP and ITP includes the processor being configured to perform single value decomposition (SVD) on a cross-channel matrix for transmissions from the transmitter devices in the second tier network to a user device in the first tier network, and to generate a non-diagonal CTP matrix in accordance with the performed SVD.

21. The network component of claim 20, wherein the processor being configured to perform both cooperative CTP and ITP includes the processor being configured to calculate a second channel matrix for the transmit signals in the second tier network in accordance with the non-diagonal CTP matrix.

22. A network component adapted to reduce or avoid signal interference in a first tier network from a second tier network and within the second tier network, the network component comprising:
a transmitter; and
a processor communicatively connected to the transmitter, wherein the processor is configured to perform both a first precoding and a second precoding for transmitter devices in the second tier network, the processor being configured to perform the first pre-coding to reduce or cancel interference in the first tier network caused by transmissions of the transmitter devices in the second tier network, and the processor being configured to perform the second pre-coding in accordance with information generated from the first precoding to reduce or cancel intra-signal interference in the second tier network caused by transmissions of the transmitter devices in the second tier network, and
wherein the transmitter is configured to forward information about the first precoding and the second precoding to the transmitter devices in the second tier network.

23. The network component of claim 22, wherein the processor being configured to perform both the first precoding and the second precoding including the processor being configured to perform both the first precoding and the second precoding according to channel state information (CSI) of signals received by the receiver devices in the first tier network from the transmitter devices in the second tier network, CSI of signals received by the receiver devices in the second tier network from the transmitter devices in the second tier network, and CSI of signals received by the receiver devices in the second tier network from a transmitter device in the first tier network.

24. The network component of claim 22, wherein the processor being configured to perform the first precoding including the processor being configured to generate a non-diagonal matrix having a dimension equal in length to $(K-1)N+KL$, where K is a total number of the receiver devices in the second tier network, N is a total number of subcarriers used in the first tier network, and L is a cyclic prefix (CP) length used in the first tier network.

25. The network component of claim 22, wherein the receiver devices in the first tier network support orthogonal frequency-division multiplexing (OFDM) or OFDM Access (OFDMA) communications, and wherein the transmitter devices and the receiver devices in the second tier network support multi-user Vandermonde Frequency Division Multiple Access (MU-VFDM) communications.

26. The network component of claim 22, wherein the transmitter devices are access points, distributed antennas, or relays that communicate with the receiver devices in the second tier network.

27. The network component of claim 22, wherein the transmitter devices and the receiver devices in the second tier network are user equipments (UEs) that communicate in the second tier network using device-to-device (D2D) communications.

* * * * *